Patented Jan. 19, 1932

1,842,048

UNITED STATES PATENT OFFICE

EMMETT V. POSTON, OF SPRINGFIELD, ILLINOIS

PROCESS OF MANUFACTURING LIGHT WEIGHT AGGREGATES AND STRUCTURAL BLOCKS FORMED THEREOF

No Drawing. Application filed August 28, 1929. Serial No. 389,082.

My invention relates to the manufacture of light weight aggregates and structural units formed therefrom; an object being in this process to provide a method of successfully heat treating argillaceous materials and other clayey soils so as to make them much lighter in weight and yet strong and durable in connection with the uses for which they are adapted not only in loose form as an element in a concrete mixture but particularly as a complete construction unit as a finished product in itself.

A particular object of my invention is to provide a process of manufacturing light weight aggregates for building or other construction purposes and a process by which construction units may be formed as a complete unit and finished product from such aggregates without the necessity of using a binding agent to hold the aggregate materials together, other than the adhering qualities of the aggregate materials alone which they possess after being heat treated by my process.

As a characteristic and generic feature of my invention I provide a process whereby the raw argillaceous materials are subjected to an application of relatively high temperature within a closure or other suitable container which is relatively free from oxygen while the materials are being exposed to the heat. This may be regarded as a smothering or cooking treatment of the argillaceous materials as distinguished from burning them and is a treatment which under certain conditions will cause the treated materials to be relieved of their moisture content and certain gases and other chemical matter normally found in the raw materials causing the heated materials to swell during the application of heat thereto even to a cellular and plastic condition while yet hot and to remain cellular strong and tough and durable after cooling and much lighter in weight thereafter.

In manufacturing light weight aggregates from argillaceous materials and forming construction units therefrom in connection with my process I have found there where such materials as clay, clay and shale, or shale alone are subjected to heat treatment in my process that the results obtained will vary with the type of raw materials used as well as to the intensity of heat applied and the duration of time of the heat exposure. In addition to this other variations may be provided by using a catalytic agent such as hydrogen gas to hasten the effects produced or by varying the amount of moisture content in the raw materials at the time they are subjected to the heat.

I have found for instance that where the argillaceous materials are carefully smothered while being subjected to the heat treatment that they may be exposed to the heat for a relatively long period of time at a relatively low temperature level for treating such materials, with good results; while satisfactory results may also be obtained by subjecting the materials while in a smothering inclosure relatively free from oxygen where the heat is applied for a relatively short time at a relatively high temperature level.

In a study of my process it should be borne in mind that I am aware of the fact that there are other processes adapted to produce light weight aggregates from argillaceous materials by which in practically all cases they require the use of cements and other binding agents to mix with the heat treated materials before the mixture is molded into suitable forms as finished products.

My process will accomplish that known result and do it more uniformly at a smaller operating expense and a much smaller initial expense for operating equipment. However, with my process I am able to produce a tougher more substantial product from argillaceous materials as well as a more uniform product even should it be desired to use it with cement or other binding agents as is done in using the product of other well known processes.

A novel and an outstanding feature of my process however is found in the fact that even without the use of any cements or outside binding agents I am able to produce complete units such as blocks, bricks, tile, tubes and the like as finished products by molding them or stamping them or forming them in pressure dies through continuous forming machines, in any suitable shape while the heated materials are yet hot.

After being thus formed the materials may be permitted to cool and then be cut up into smaller units of suitable shape and size or they may be cut in a practical manner before they get cool after leaving the forming die.

My process will successfully treat argillaceous materials such as raw clay either in its natural state or in a pulverized condition or shale and clay together or shale alone or they may be used in various percentages of mixture of each or any other argillaceous materials subject to heat treatment within the limits of my process.

My process is adapted to successfully apply the heat treatment to the raw materials while dry or after wetting even up to a plastic consistency. This novel manner of heat treating the materials with an intense application of high temperature and keeping them smothered or confined relatively free from oxygen while being heated, tends to swell the heated mass to a cellular plasticity of a consistency that will make it workable either to mold, press or otherwise shape it into columns, blocks, tiles, tubes, or other forms while hot.

This smothering operation tends to cause the heated materials to expand at certain rates to certain limits under predetermined conditions. Under certain conditions for instance in the heat treatment the materials become cellular and expanded in a very short time with the time element usually determined largely by the intensity of heat applied, the kind of materials used or the moisture content thereof when the heat is applied up to practical limits for accomplishing the desired results, as well as to the freedom from oxygen of the chamber or closure containing the materials while they are being heat treated.

By my process I obtain, as a result of the heating and smothering operation, a strong and substantial material of cellular structure with a somewhat spongy appearance with relatively great strength for its unit weight and relatively light density.

My process produces a strong and durable article rough enough to surface pits and cells to help hold the structural units in place in a wall or the like where plaster or cement may be used as a binding agent for holding the finished units in place.

I do not wish to be unnecessarily limited in the manner in which I handle my materials in connection with my process. For instance in some situations it may be desirable to convey the raw materials to a heat treating oven or die relatively free from oxygen and subject them to a slowly applied temperature of say approximately 1400 degrees for an extended period so as to cause the materials to swell and become cellular as moisture and gases therein are expanded and discharged by the heat. A more intense heat however may get similar results in a shorter time.

These gases in the heated materials will be quickly released when the temperature has reached a relatively high level where it will somewhat soften the material to a condition permitting the expanding gases to move through it to escape. The expanding gases tend to form into little spheres and will do so in water as they make their escape therefrom but irregularities develop in those forms due to the resistance of these materials against the confined gases, thus causing the material to form into a body full of cellular shapes of various sizes ranging from very minute cells to relatively large ones such as would have the appearance of a sponge in looking at a cross section of the same.

By my process the heat treated materials swell more quickly at a relatively lower temperature while smothered in confinement without oxygen than would be required if the same materials were burned in a combustion chamber with the free application of oxygen forming a part of the burning process.

From the foregoing it will be evident that my process may produce varied results depending on the manner of heat treatment of the materials under smothered conditions.

The raw materials may be handled as they are taken from the ground as raw clay, shale, or suitable mixtures thereof without moistening and confined to a heat treating oven or chamber and subjected to heat applications varying from approximately 1400 degrees for a slower and longer application up to approximately 2500 degrees or even 3500 degrees Fahrenheit for a relatively short period of time for a more intense heat treatment to get as good results in a shorter time.

The raw materials may be crushed and wet even up to a plastic consistency if desired before moving them into the smothering or heat treating chamber in which condition with a quickly applied intense heat a greater swelling may be expected in the heat treatment of the materials.

It will be understood by those who are familiar with the handling of moistened argillaceous materials through heat treatments of any kind to provide for safety in accomplishing my process provision should be made through valves or other escapements for the automatic release of steam which may develop from intense applications of heat to the mixture but in this process that should be done in a manner that will not admit more than a minimum if any oxygen to the heat chamber.

The state of this art at present is such that it would make it difficult to anticipate the various adaptations of the product of my process either for an unfinished or a finished article of manufacture beyond the numerous adaptations thereof in construction work now common to brick, tile, tubes and the like. It is certain however that there are numerous advantages that my process will develop which will result in enormous savings of labor and expense in making practical, durable, light weight aggregates and structural units therefrom that will be convenient to handle even practical to drive nails or screws into and in many other ways apparently novel improvements over the ordinary block or tile units now used for construction purposes where a relatively low weight and density must be considered along with strength, durability and appearance.

Having thus described the nature of my novel process what I claim is:

1. The process of manufacturing light weight construction materials from argillaceous materials consisting in heating the raw materials to a relatively high temperature while moving through a closure relatively free from oxygen.

2. The process of manufacturing light weight construction materials from argillaceous materials consisting in heating the raw materials to a relatively high temperature while moving within and through a closure relatively free from oxygen and subsequently cooling the same.

3. The process of manufacturing light weight construction materials from argillaceous materials consisting in heating the raw materials to a relatively high temperature for a relatively short time while moving through a closure relatively free from oxygen sufficient to bring the heated materials to a swollen and cellular condition and subsequently cooling the materials.

4. The process of manufacturing light weight construction materials from argillaceous materials consisting in mixing with the raw materials a catalytic agent and heating the mixture to a relatively high temperature for a relatively short time while confined within a closure relatively free from oxygen.

5. The process of manufacturing light weight aggregates comprising wetting the raw aggregate materials and mixing with any suitable percentage of moisture up to and including a plastic consistency, subjecting the mixture to a relatively high temperature heat for a relatively short time in a closure relatively free from oxygen, while moving the materials through the closure.

6. The process of manufacturing light weight aggregates comprising wetting the raw aggregate materials and mixing with any suitable percentage of the respective materials up to and including a plastic consistency, subjecting the mixture for a relatively short time to a relatively high temperature in a closure relatively free from oxygen and subsequently cooling the heated materials.

7. The process of manufacturing light weight aggregates comprising wetting the raw aggregate materials and mixing with any suitable percentage of moisture up to and including a plastic consistency, subjecting the mixture to a relatively high temperature for a relatively short time by moving them through a closure relatively free from oxygen sufficient to bring the heated materials to a swollen and cellular condition.

8. The process of manufacturing light weight aggregates comprising wetting the raw aggregate materials and mixing with any suitable percentage of the respective materials up to and including a plastic consistency, subjecting the mixture to a relatively high temperature for a relatively short time in a closure relatively free from oxygen sufficient to bring the heated materials to a cellular and swollen condition while moving the materials through the closure and subsequently cooling the materials.

9. The process of manufacturing light weight aggregate structural units consisting in subjecting the materials to a relatively high temperature within a closure relatively free from oxygen for a relatively short time while moving therethrough and subsequently forming the heated materials into structural units of predetermined sizes and shapes.

10. The process of manufacturing light weight aggregate structural units consisting in subjecting the materials to a relatively high temperature within a closure relatively free from oxygen for a relatively short time and forming the heated materials while still hot into structural units of predetermined sizes and shapes.

11. The process of manufacturing light weight aggregate structural units consisting in subjecting the materials to a relatively high temperature within a closure relatively free from oxygen for a relatively short time while moving therethrough and forming the heated materials while still hot into structural units of predetermined sizes and shapes and subsequently cooling the materials.

12. The process of manufacturing light weight aggregate construction units consisting in subjecting the materials to a relatively high temperature within a closure relatively free from oxygen for a relatively short time and forming the heated materials while still hot into structural units of predetermined sizes and shapes and subsequently cooling the materials and after cooling cut into other desired sizes and shapes.

13. The process of manufacturing light weight aggregate structural units consisting in subjecting the materials to a relatively high temperature within a closure relatively free from oxygen sufficient to bring the heated materials up to a cellular condition for a relatively short time and forming the heated materials into structural units of predetermined sizes and shapes and subsequently cooling the heated materials.

14. The process of manufacturing light weight aggregate structural units consisting in subjecting the materials to a relatively high temperature within a closure relatively free from oxygen sufficient to bring the heated materials up to a cellular and spongy condition for a relatively short time and forming the heated materials into structural units of predetermined sizes and shapes before cooling, and after cooling cut into other desired smaller sizes and shapes.

15. The process of manufacturing light weight aggregate structural units consisting in wetting the raw aggregate materials and mixing with any suitable percentage of each in moisture up to and including a plastic consistency, subjecting the mixture to a relatively high temperature for a relatively short time in a closure relatively free from oxygen while the materials move therethrough and forming the heated materials into structural units of predetermined sizes and shapes.

16. The process of manufacturing light weight aggregate structural units consisting in wetting the raw aggregate materials and mixing with any suitable percentage of moisture up to and including a plastic consistency, subjecting the mixture to a relatively high temperature for a relatively short time in a closure relatively free from oxygen sufficient to bring the heated materials to a cellular condition and forming the heated materials into structural units of predetermined sizes and shapes.

17. The process of manufacturing light weight aggregate structural units consisting in wetting the raw aggregate materials and mixing with any suitable percentage of moisture up to and including a plastic consistency, subjecting the mixture to a relatively high temperature heat for a relatively short time in a closure relatively free from oxygen sufficient to bring the heated materials to a cellular condition and forming the heated materials while still hot into structural units of predetermined sizes and shapes and subsequently cooling the heated materials.

18. The process of manufacturing light weight structural units from argillaceous materials consisting in mixing a catalytic agent with the raw materials, and subjecting the mixture to an application of relatively high temperature for a relatively short time while confined in a space relatively free from oxygen and forming the heated materials into structural units of predetermined sizes and shapes.

19. The process of manufacturing light weight aggregate structural materials consisting in subjecting raw argillaceous materials to a relatively high temperature in a closure relatively free from oxygen for a relatively short time under pressure and removing the heated mixture from the closure by pressure while hot.

20. The process of manufacturing light weight aggregate structural materials consisting in subjecting raw argillaceous materials to a relatively high temperature in a closure relatively free from oxygen for a relatively short time under pressure and discharging the heated materials by pressure while hot.

21. The process of manufacturing light weight aggregate structural materials consisting in mixing a catalytic agent with raw argillaceous materials, subjecting the mixture to a relatively high temperature in a closure relatively free from oxygen for a relatively short time under pressure and discharging the heated materials by pressure while hot, and subsequently cutting the materials into structural units of predetermined sizes and shapes.

22. The process of manufacturing light weight aggregate structural materials consisting in subjecting raw argillaceous materials to a relatively high temperature in a closure relatively free from oxygen for a relatively short time under pressure and discharging the heated materials by pressure while hot, cooling and subsequently cutting the discharged materials into structural units of predetermined sizes and shapes.

EMMETT V. POSTON.